United States Patent
Yoo et al.

(10) Patent No.: US 9,672,051 B2
(45) Date of Patent: Jun. 6, 2017

(54) APPLICATION PROGRAMMING INTERFACE FOR A SHARING SERVICE

(71) Applicant: Amazon Technologies, Inc., Seattle, WA (US)

(72) Inventors: Won Suk Yoo, Irvine, CA (US); Calvin Yue-Ren Kuo, Irvine, CA (US); Salman Aftab Paracha, Redmond, WA (US); Christopher Andrew Stephens, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 13/770,309

(22) Filed: Feb. 19, 2013

(65) Prior Publication Data

US 2014/0237490 A1    Aug. 21, 2014

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |
| *G06Q 10/10* | (2012.01) |
| *H04L 29/06* | (2006.01) |

(52) U.S. Cl.
CPC .............. *G06F 9/4445* (2013.01); *G06F 9/54* (2013.01); *G06Q 10/101* (2013.01); *H04L 65/1069* (2013.01); *H04L 65/403* (2013.01); *H04L 65/4015* (2013.01)

(58) Field of Classification Search
None
See application file for complete search history.

(56) References Cited

U.S. PATENT DOCUMENTS

| | | | |
|---|---|---|---|
| 8,226,486 B2 | 7/2012 | Mooney et al. | |
| 8,328,643 B1 | 12/2012 | Osvald et al. | |
| 8,333,641 B2 | 12/2012 | Sullivan et al. | |
| 9,095,779 B2 | 8/2015 | Chan et al. | |

(Continued)

FOREIGN PATENT DOCUMENTS

| | | |
|---|---|---|
| CN | 101115019 | 1/2008 |
| CN | 101385016 | 3/2009 |
| JP | 2011188887 | 9/2011 |

OTHER PUBLICATIONS

International Search Report dated May 29, 2014 in PCT/US14/16896, filed Feb. 18, 2014, Applicant: Amazon Technologies, Inc.

(Continued)

*Primary Examiner* — Craig Dorais
(74) *Attorney, Agent, or Firm* — Lee & Hayes, PLLC

(57) ABSTRACT

A computing device executes an application that is configured to call a sharing service application programming interface ("API") to create a sharing session via a sharing service. The application can call the sharing service API to utilize one or more methods exposed by the sharing service API to connect to the sharing service and initiated the creation of the sharing session. The computing device can join the sharing session with one or more other computing devices. The computing device can receive data via the sharing session from one or more of the other computing devices. The data can include screen data and/or application data.

18 Claims, 12 Drawing Sheets

(56) References Cited

U.S. PATENT DOCUMENTS

| | | | |
|---|---|---|---|
| 2003/0153373 A1 | 8/2003 | Squibbs | |
| 2004/0021645 A1* | 2/2004 | Kobayashi | G06F 3/0433 345/173 |
| 2006/0247021 A1 | 11/2006 | Bulthuis | |
| 2007/0021216 A1 | 1/2007 | Guruparan | |
| 2007/0191104 A1 | 8/2007 | Van Luchene | |
| 2008/0004117 A1 | 1/2008 | Stamper et al. | |
| 2009/0118016 A1 | 5/2009 | Ben-Artzi et al. | |
| 2009/0163272 A1 | 6/2009 | Baker et al. | |
| 2010/0285858 A1* | 11/2010 | Clowes et al. | 463/9 |
| 2011/0252145 A1* | 10/2011 | Lampell et al. | 709/227 |
| 2012/0122590 A1 | 5/2012 | Nguyen | |
| 2012/0142429 A1 | 6/2012 | Muller | |
| 2012/0283011 A1 | 11/2012 | Van Luchene | |
| 2013/0035158 A1 | 2/2013 | Osvald et al. | |
| 2013/0041790 A1 | 2/2013 | Murugesan et al. | |
| 2013/0084985 A1* | 4/2013 | Green et al. | 463/40 |
| 2013/0237300 A1 | 9/2013 | Johnson | |
| 2013/0252725 A1 | 9/2013 | Buhr | |
| 2014/0235326 A1 | 8/2014 | Paracha et al. | |

OTHER PUBLICATIONS

Totilo, S. "Kind Code Demo Shows New Super Mario Bros on Auto-Pilot", Oct. 5, 2009 [online][retrieved on Feb. 19, 2013], retrieved from: www.kotaku.com/5374432/kind-code-demo-shows-new-super-mario-bros-on-auto-pilot , 5 pps.

Office Action for U.S. Appl. No. 13/770,299, mailed on Jan. 16, 2015, Salman Aftab Paracha, "Delegating Video Game Tasks Via a Sharing Service", 23 pages.

The Canadian Office Action mailed Nov. 8, 2016 for Canadian patent application No. 2901694, a counterpart foreign application of U.S. Appl. No. 13/770,299, 3 pages.

Office Action for U.S. Appl. No. 13/770,299, mailed on Dec. 1, 2016, Salman Aftab Paracha, "Delegating Video Game Tasks Via a Sharing Service", 37 pages.

Office action for U.S. Appl. No. 13/770,299, mailed on May 27, 2016, Paracha et al., "Delegating Video Game Tasks Via a Sharing Service", 34 pages.

The Extended European Search Report mailed Sep. 9, 2016 for European patent application No. 14754173.4, 11 pages.

Wikipedia, "Cooperative Gameplay", Internet Citation, Sep. 28, 2011, pp. 1-5, retrevied from the internet at URL:http://en/wikipedia.org/w/index.php?title=Cooperative_gameplay&oldid=452899586, retrieved on Mar. 21, 2012.

Wikidpedia, "Farmvillle", Internet Citation, Sep. 19, 2011, pp. 1-5, retrieved from the Internet at URL:http://en.wikipedia.org/w/index.php?title=FarmVille&oldid=451365820, retrieved on Mar. 21, 2012.

Translated the Japanese Office Action mailed Oct. 18, 2016 for Japanese patent application No. 2015-558196, a counterpart foreign application of U.S. Appl. No. 13/770,299, 8 pages.

Office action for U.S. Appl. No. 13/770,299, mailed on Nov. 24, 2015, Paracha et al., "Delegating Video Game Tasks Via a Sharing Service", 37 pages.

Office action for U.S. Appl. No. 13/770,299, mailed on Aug. 12, 2015, Paracha et al., "Delegating Video Game Tasks Via a Sharing Service", 29 pages.

Chinese Office Action mailed Jan. 26, 2017 for Chinese Patent Application No. 201480016622.1, a counterpart foreign application of U.S. Appl. No. 13/770,299, 12 pages.

* cited by examiner ically call a sharing service API to create a sharing session via a sharing service. The application can call the sharing service API to utilize one or more methods exposed by the sharing service API to connect to the sharing service and initiated the creation of the sharing session. The computing device can join the sharing session with one or more other computing devices. The computing device can receive data via the sharing session from one or more of the other computing devices. The data can include screen data and/or application data.

APPLICATION PROGRAMMING INTERFACE FOR A SHARING SERVICE

BACKGROUND

In recent years, the adoption of computing devices such as smartphones, tablets, and electronic book readers ("e-readers") has exposed many people to video games. This is in part due to the network-connectivity offered by these devices, and the robust application ecosystems that support the download of video games and other applications to these devices. As a result, video games have become a popular past-time for many people.

Video games can be challenging for even the most seasoned of players. The World Wide Web provides access to many forums, blogs, and other information sources that players can use to gain an advantage in a video game or learn how to complete certain game tasks, such as completing a level or beating a boss character. There are, however, still occasions when a player lacks the skill to complete a game task. This can be disheartening to the player and may result in the player giving up, even if the player genuinely wants to proceed beyond the insurmountable game task.

It is respect to these and other considerations that the disclosure made herein is presented.

DETAILED DESCRIPTION

The following detailed description is directed to an application programming interface ("API") for a sharing service.

According to one aspect disclosed herein, a computing device executes an application that is configured to call a sharing service API to create a sharing session via a sharing service. The application can call the sharing service API to utilize one or more methods exposed by the sharing service API to connect to the sharing service and initiated the creation of the sharing session. The computing device can join the sharing session with one or more other computing devices. The computing device can receive data via the sharing session from one or more of the other computing devices. The data can include screen data and/or application data.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
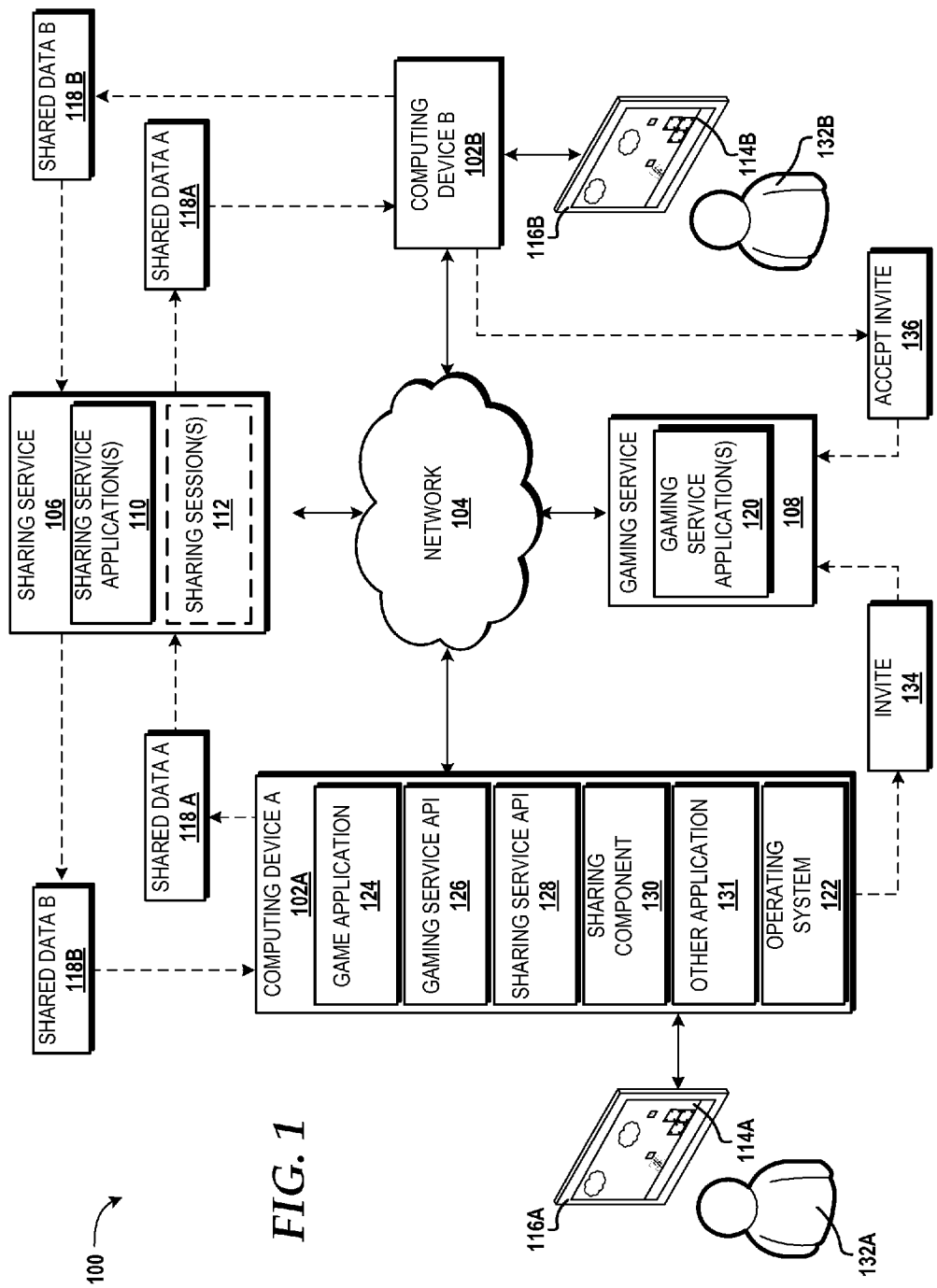
FIG. 1 is a system diagram showing an illustrative operating environment for the various embodiments disclosed herein.

Referring now to FIG. 1, aspects of one operating environment 100 for the various embodiments presented herein will be described. The operating environment 100 shown in FIG. 1 includes a computing device A 102A and a computing device B 102B, each operating as a part of and/or in communication with a communications network ("network") 104. According to some embodiments, the computing device A 102A and the computing device B 102B can each include a user computing device, such as a tablet computing device, a personal computer ("PC"), a desktop computer, a laptop computer, a notebook computer, a cellular phone or smartphone, other mobile computing devices, a personal digital assistant ("PDA"), video game system, set-top box, smart television, or the like.

According to some other embodiments, the functionality of the computing device A 102A and/or the computing device B 102B can be provided by a cloud-based computing platform that can be provided by one or more application servers, Web servers, data storage systems, network appliances, dedicated hardware devices, and/or other server computers or computing devices. In these embodiments, the computing device A 102A and/or the computing device B 102B can include minimal hardware for connection to the cloud-based computing platform via the network 104. For purposes of illustrating and describing the concepts and technologies disclosed herein, the functionality of the computing device A 102A and the computing device B 102B is described herein as being provided by a user computing device. In light of the alternative embodiments of the computing device A 102A and the computing device B 102B described above, it should be understood that this example is illustrative, and should not be construed as being limiting in any way.

The computing device A 102A and the computing device B 102B can communicate via the network 104 to access various services described herein. For example, the computing device A 102A and the computing device B 102B can access a sharing service 106 and/or a gaming service 108. The functionality of the sharing service 106 and the gaming service 108 can be provided by one or more application servers, Web servers, data storage systems, network appliances, dedicated hardware devices, and/or other server computers or computing devices.

The sharing service 106 can be configured to execute one or more sharing applications 110 to create and manage one or more sharing sessions 112 during which the computing device A 102A can share the entirety or specific portions of a screen A 114A that is being locally presented by the computing device A 102A via one or more displays, such as a display A 116A, with the computing device B 102B over the network 104. Likewise, during the sharing session 112, the computing device B 102B can share the entirety or specific portions of a screen B 114B that is being locally presented by the computing device B 102B via one or more displays, such as a display 116B, with the computing device A 102A over the network 104. Although only two computing devices are shown, the sharing session 112 created by the sharing service 106 may support connections to any number of computing devices so that one or more users utilizing the various computing devices can share data with one another. As such, the illustrated example is merely illustrative, and should not be construed as being limiting in any way.

The sharing session 112 can be configured to support one-way communication whereby a designated source device is able to send data to one or more designated destination devices, but the one or more designated destination devices are unable to send data to the designated source device. Alternatively, the sharing session 112 can be configured to support two-way communication whereby two or more computing devices are able send data to and receive data from one another. As such, the sharing session 112 can be used for collaborative or sharing-only purposes.

In some embodiments, a user can provision another user with his or her security credentials, such as, but not limited to, username and password. For example, a first user can provide his or her security credentials so that the second user can control one or more applications executing on a device associated with the first user via the sharing service 106 and/or gain access to other services such as the gaming service 108 on behalf of the first user. It is contemplated that the security credentials may utilize any single-factor or multi-factor authentication scheme.

As used herein, a "screen" refers to the visual content and the arrangement of that content being output by a computing device for display on one or more displays. In other words, a "screen" is what is being displayed on one or more displays that are connected to or otherwise in communication with a computing device. A screen can include a snapshot of what is being displayed on one or more displays at a particular instance of time. A screen can additionally or alternatively include a data stream of what is being displayed on one or more displays over time. The latter case of a screen is sometimes referred to herein as a "screen stream."

In addition to screen sharing, the sharing service 106 can provide application data sharing, whereby data associated with one or more applications that are being executed by a computing device can be shared with one or more other computing devices that are connected to the sharing session 112. Application data can include, but is not limited to, data derived from user input to an application being executed by a computing device and other data output by the application in response to the input. Application data can be shared discretely or as a stream of application data. In some embodiments, application data includes game control data associated with input received to control a game application, as will be described in greater detail below.

The sharing service 106 can create the sharing session 112 so that the computing device A 102A can share data (shown as shared data A 118A) with the computing device B 102B. Likewise, the sharing service 106 can create the sharing session 112 so that the computing device B 102B can share data (shown as shared data B 118B) with the computing device B 102B. As explained above, however, the illustrated example is merely illustrative, and should not be construed as being limiting in any way.

The gaming service 108 can be configured to facilitate user interaction with one or more gaming service applications 120 that are executed by the gaming service 108. The gaming service application(s) 120 can provide features such as, but not limited to, online cooperative multiplayer gaming, online competitive multiplayer gaming, chat features, messaging features, online leaderboards, achievement tracking features, advertising features, marketplace features, and friends list features. The gaming service application(s) 120 can additionally or alternatively provide or assist in providing a game task delegation feature, as will be described in greater detail below.

The computing device 102A can be configured to execute an operating system 122 and one or more application programs such as, for example, a game application 124, a gaming service application programming interface ("API") 126, a sharing service API 128, a sharing component 130, other application 131, and/or other application programs or components. The operating system 122 is a computer program for controlling the operation of the computing device A 102A. The application programs are executable programs configured to execute on top of the operating system 122 to provide various functionality described herein. Although the computing device B 102B is not shown in the same configuration as the computing device A 102A, it should be understood that the computing device B 102B may be identically configured or may have more or less application programs and/or components than are illustrated for the computing device A 102A.

The game application 124 can be configured to provide an interactive video gaming experience whereby one or more players can control or otherwise interact with visual content that is presented on a display. The visual content can include, but is not limited to, characters, levels, maps, areas, stages, worlds, spaces, shapes, and objects. The visual content can be two-dimensional, three-dimensional, or a combination thereof. The game application 124 can also provide audial content such as, but not limited to, music, speech, and sound effects. The game application 124 can also provide haptic feedback, such as vibration feedback.

The game application 124 can be designed to have one or more game tasks that the player(s) can complete. A game task can generally include anything one or more players can do by interacting with the visual content provided by the game application 124. As a simple example, a game task might be for a player to control a virtual character to traverse a level from a pre-defined starting point to a pre-defined end point so as to complete or "beat" the level. A further game task using this example might be to control the virtual character to traverse a level while avoiding contact with certain objects or characters (e.g., enemies). It should be understood that these examples are illustrative, and should not be construed as being limiting in any way.

The game application 124 can also be designed to have one or more objectives that can be completed by the player(s). An objective is a game task that is defined by a developer of the game application 124. In other words, an objective is a goal or purpose of the game application 124. The game application 124 may have multiple objectives. An objective can be discrete in that it is not linked in any way to another objective. Alternatively, an objective can be linked or otherwise combined with one or more other objectives.

In some embodiments, the game application 124 provides a sandbox in which the player(s) can create their own game tasks, which may be ongoing or fleeting for the player(s). The sandbox may be provided in addition to established objectives or in lieu thereof.

The game application 124 can be designed to have one or more achievements. An achievement is an accolade provided to a player or group of players in recognition of a particular interaction with the game application 124. An achievement can be as simple as starting the game application 124 for the first time (or some other number of times), interacting with certain features provided by the game application 124 (e.g., entering a certain menu or selecting a certain menu option such as a "hard" difficulty level), or completing one or more objectives. When a player performs a particular interaction that is tied to an achievement, the achievement becomes "unlocked." The game application 124 may notify the player(s) of the "unlocked" achievement by presenting an achievement alert. An achievement alert can be presented in a visual, audial, and/or haptic manner. The act of unlocking an achievement may be a game task. Unlocking an achievement may enable the ability to unlock additional achievements.

Achievements can be defined by the developers(s) of the game application 124, by the gaming service 108, or by some other entity, including, for example, a player. In some embodiments, achievements are managed locally by the computing device A 102A, for example, by the game application 124, by the operating system 122, or by some other application program being executed by the computing device A 102A. In some other embodiments, achievements are managed remotely in a cloud-based configuration by the gaming service 108. In these embodiments, a player can set up an account with the gaming service 108. The account can include user identification and one or more security credentials to maintain security of the account. The achievements earned by a player can be associated with his or her account with the gaming service 108 so that, for example, if the player changes to a different computing device, the player can still access his or her achievements and be able to earn new achievements on the different computing device.

The game application 124 can be designed to have one or more leaderboards. A leaderboard can track the completion of an objective in a manner so as to rank the completion of an objective among players. For example, an objective may be to obtain the highest score in a finite amount of time or using a finite number of lives, and a leaderboard associated with this objective can include a ranking of scores in a particular order, such as a list of scores ranked in descending order. In some embodiments, leaderboards are managed locally by the computing device A 102A, for example, by the game application 124, by the operating system 122, or by some other application program being executed by the computing device A 102A. In some other embodiments, leaderboards are managed remotely in a cloud-based configuration by the gaming service 108. In these embodiments, a player can elect to upload or the game application 124 can automatically upload scores achieved by the player to the gaming service 108. The gaming service 108 may present leaderboards for public viewing and/or private viewing, such as by a group of players selected by the player that elected to upload the score. The scores earned by a player can be associated with his or her account with the gaming service 108 so that if the player changes to a different computing device, the player can still try to beat his or her high score on the leaderboard using the same user identification.

Input to the game application 124 can be provided via one or more input devices that are connected to or otherwise in communication with the computing device A 102A. Input to the game application 124 can be used to control aspects of the game application 124, such as, for example, controlling characters, navigating menus, and control towards completion of one or more game tasks. An input device can include, but is not limited to, a keyboard, mouse, joystick, game pad, touchpad, resistive touchscreen, capacitive touchscreen, multi-touch enabled touchscreen, still camera, video camera, microphone, infrared camera, motion control device, global positioning system ("GPS") sensor, proximity sensor, motion sensor (e.g., accelerometer), ambient light sensor, moisture sensor, gyroscope, dance pad, steering wheel, flight yoke, pedal, musical instrument, toy musical instrument, and sports equipment. In some embodiments, one or more input devices are built-in to the computing device A 102A, such as a tablet computing device with a multi-touch enabled touchscreen. In some other embodiments, one or more input devices are connected to the computing device A 102A using hardwire and/or wireless connection. The physical components and/or protocols utilized to establish and maintain one or more connections between an input device and the computing device A 102A can be standards-based, non-standards-based, or proprietary.

The computing device A 102A can be configured to present the visual content provided by the game application 124 on one or more display devices that are built-in to or external to and in communication with the computing device A 102A, such as the display A 116A. The display A 116A is an output device configured to present information in a visual form. In particular, the display A 116A may present visual content provided by the game application 124, graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display A 116A is a liquid crystal display ("LCD") utilizing any active or passive matrix technology and any backlighting technology (if used). In some embodiments, the display A 116A is an organic light emitting diode ("OLED") display. Other display types are contemplated. In addition, the display A 116A can include an input device such as a touchscreen or multi-touch enabled touchscreen. The display B 116B can be likewise configured.

The game application 124 can be configured to call one more methods exposed by the gaming service API 126 to access the gaming service 108 via the network 104 to take advantage of one or more of the features provided by the gaming service 108. The game application 124 can also be configured to call one or more methods exposed by the sharing service API 128 to access the sharing service 106 via the network 104. The sharing service API 128 can access the sharing component 130 to provide data to the sharing service 106 and receive data from the sharing service 106 during a sharing session. The sharing component 130 is illustrated and described in greater detail with reference to FIG. 2.

As described above, the game application 124 can provide one or more game tasks that can be completed by one or more players. For one reason or another, a player may be unable to complete a game task. For example, the game task may be too difficult for the player to complete, the player may be disinterested in the game task but is interested in a subsequent game task, the player lacks the time required to complete the game task, or for any number of other reasons. As a solution, the player can elect to delegate the game task to another player so that the other player can complete the task on behalf of the player that delegated the game task.

In the illustrated example, a player A 132A that is playing the game application 124 on the computing device A 102A can elect to delegate the game task to a player B 132B that is associated with the computing device B 102B. The player B 132B can accept or deny the game task. If the player B 132B accepts the game task, the player B 132B can attempt to complete the game task on behalf of the player A 132A utilizing the computing device B 102B.

In some embodiments, the computing device A 102A communicates with the sharing service 106 to create the sharing session 112 to share the shared data A 118A, wherein the shared data A 118A includes a screen stream of the game application 124 being executed by the computing device A 102A. In these embodiments, the player B 132B can provide input to the computing device B 102B via one or more input devices that are connected to or otherwise in communication with the computing device B 102B to play the game application 124 in an effort to complete the game task delegated by the player A 132A to the player B 132B. In this manner, the player B 132B can assist the player A 132A to complete the game task, after which the sharing session 112 can be torn down and the player A 132A can resume playing the game application 124 after the game task has been completed for him or her by the player B 132B.

In some other embodiments, the computing device A 102A communicates with the sharing service 106 to create the sharing session 112 to share the shared data A 118A, wherein the shared data A 118A includes a game state of the game application 124 before a delegated game task has been completed. In these embodiments, the computing device B 102B receives the game state via the sharing session 112 and launches the same game application on the computing device B 102B to load the game state. The game state is loaded and the player B 132B can provide input to the computing device B 102B via one or more input devices that are connected to or otherwise in communication with the computing device B 102B to play the game application in an effort to complete the game task delegated by the player A 132A. After the game task is completed, the computing device B 102B can save a new game state of the game application 124 and can send the new game state as part of the shared data B 118B over the shared session 112 to the computing device A 102A. In this manner, the player B 132B can assist the player A 132A to complete the game task, after which the computing device A 102A can load the new game state and the player A 132A can resume playing the game application 124 from a state that includes the completed game task.

In some embodiments, the player B 132B is provisioned to play the game application 124 on behalf of the player A 132A using the user identification of the player A 132A. As such, achievements, leaderboards, and other credits associated with the completion of a game task can be credited to the player A 132A instead of the player B 132B, although it is contemplated that both the player A 132A and the player B 132B may be acknowledged for completion of the game task. The player B 132B may additionally or alternatively earn achievements, leaderboard position, and/or other credits that are not available to the player A 132A for assisting the player A 132A in completing the game task.

In some embodiments, the player B 132B is given a finite amount of time to complete the game task. In some other embodiments, the player B 132B is given an infinite amount of time to complete the game task.

In some embodiments, the player B 132B is compensated for completing the game task. Compensation for completing the game task can include, but is not limited to, real currency, virtual currency, one or more in-game items for the game application 124, one or more in-game items for another game application, and credit for the purchase of real or virtual products from an online merchant.

A virtual currency may be represented by units, such as, but not limited to, "coins," "points," "virtual dollars," and the like. A "unit" of virtual currency, whether a coin, a point, a virtual dollar, or other unit, may have a value that is tied to a real currency, such as the U.S. dollar. A "coin" may represent, for example, ¹⁄₁₀₀ of a U.S. dollar or 1 U.S. cent within the gaming service 108 so that an item that costs $2.99 in U.S. dollars and cents would alternatively cost 299 coins. It should be understood that the value of a virtual currency unit may be changed from time to time to accommodate changes in the value of the real currency to which it is tied or for any number of other reasons, such as those particular to the entity that provides the gaming service 108. It should also be understood that items may be made available for purchase via the gaming service 108 using virtual currency, real currency, or a combination thereof as the method for payment.

In some embodiments, the gaming service 108 provides a marketplace through which players can purchase content, such as, for example, applications, game applications, game add-ons, in-game items, music, e-books, movies, and the like. Virtual currency exchanged as compensation for completing a game task may be used to purchase such content from the marketplace.

In some embodiments, the player A 132A can set up an auction to solicit the help of another player to assist the player A 132A in completing a game task identified in the auction. The auction feature can be hosted by the gaming service 108. Users of the gaming service 108 can bid on the auction and the player A 132A can select a bid as the winning bid. A bid can include an amount of compensation for completing the game task. A bid can also include a deadline by which the game task will be completed. In this manner, the player A 132A can choose a winning bid based upon his or her needs with regard to completing the game task.

In some embodiments, the player A 132A can delegate a game task to two or more players. The first of the two or more players to complete the game task can be compensated. Alternatively, all players are compensated, but the first player to complete the game task in compensated the highest amount, the second player is compensated a lower amount, and so on.

In the illustrated example, the computing device A 102A generates an invitation ("invite 134") and sends the invite 134 to the gaming service 108. The invite 134 can be addressed to the player 132B. For example, the player A 132A and the player B 132B may be in a friendship within the gaming service 108, and the friendship allows the player A 132A to send the invite 134 directly to the player B 132B via a messaging feature provided by the gaming service 108. A friendship in context of the gaming service 108 is a relationship between two users facilitated by the gaming service 108 that allows the users to connect to play multi-player games, chat, and send messages to each other, including, for example, invites such as the invite 134. The player B 132B can then choose to accept or deny the invite 134. In the illustrated example, the player B 132B has accepted the invite 134, and in response, the computing device B 102B generates an invitation acceptance notification ("accept invite 136") and sends the accept invite 136 to the gaming service 108. Once the invite 134 is accepted, the game application 124 can call the sharing service API 128 to establish the sharing session 112 to enable the player B 132B to attempt to complete the game task utilizing one of the methodologies described above.

The other application 131 can include one or more Web browser applications, one or more productivity applications (e.g., word processing, spreadsheet, and/or presentation applications), one or more design applications, or any other applications. In some embodiments, the other application(s) 131 can be configured to call the sharing service API 128 to provide sharing features to users. For example, the shared data A 118A can be data shared by the other application 131 and the shared data B 118B can be data shared by the computing device B 102B that is useable by the other application 131.

FIG. 1 illustrates one network 104, one sharing service 106, one gaming service 108, one game application 124, one gaming service API 126, one sharing service API 128, one sharing component 130, one other application 131, and one operating system 122. It should be understood, however, that various implementations of the operating environment 100 include multiple networks 104, sharing services 106, gaming services 108, game applications 124, gaming service APIs 126, sharing service APIs 128, sharing components 130, other applications 131, and/or operating systems 122. As such, the illustrated embodiment should be understood as being illustrative, and should not be construed as being limiting in any way.

Figure 2:
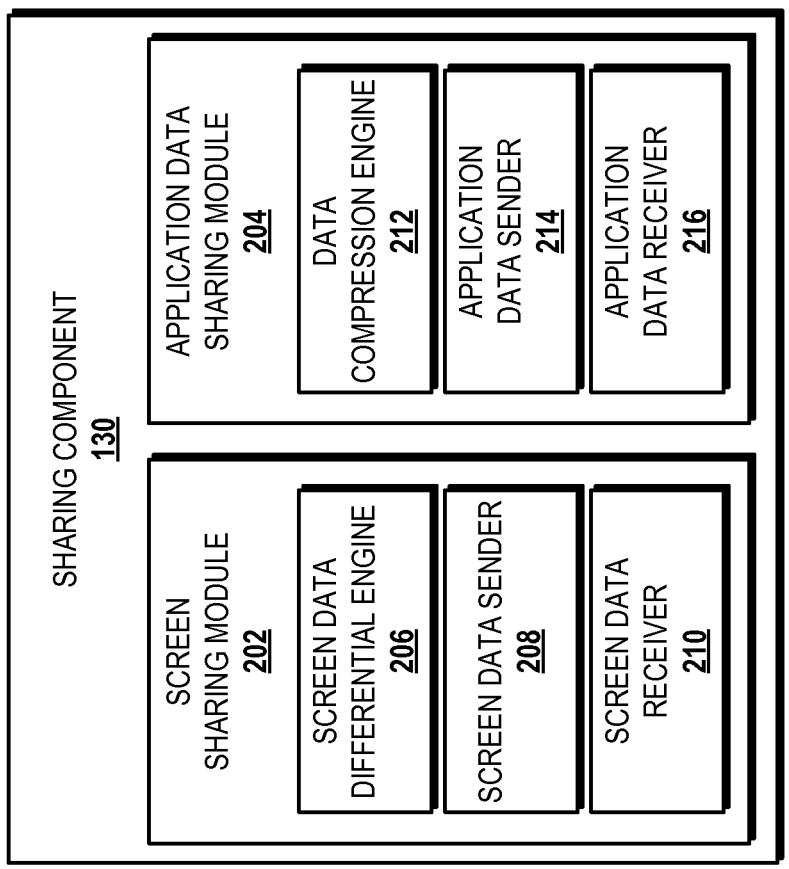
FIG. 2 is a block diagram showing aspects of a sharing component for sharing screen data and application data associated with one or more applications being executed by a computing device, according to an illustrative embodiment.

Turning now to FIG. 2, additional aspects of the sharing component 130 will be described, according to an illustrative embodiment. In some embodiments, the sharing component 130 is provided as part as client-side functionality for accessing the sharing service 106. In some embodiments, the sharing component 130 is provided as part of the operating system 122 (shown in FIG. 1). In some embodiments, the sharing component 130 is given permissions to access features of the operating system 122 such as a rendering pipeline to effectively detect and compress a buffer of screen and/or application data that is to be streamed to the sharing service 106 as part of the shared data A 118A (shown in FIG. 1).

The illustrated sharing component 130 includes a screen sharing module 202 and an application data sharing module 204. The screen sharing module 202 includes a screen data differential engine 206, a screen data sender 208, and a screen data receiver 210. The screen data differential engine 206 is configured to calculate a difference between what screen data is currently being displayed and what screen data has already been sent to the sharing service 106. The screen data differential engine 206 is also configured to send the difference to the sharing service 106, thereby saving network and other resources. It is contemplated, however, that the sharing component 130 may share all screen data output by a computing device.

The screen data sender 208 is configured to communicate with the sharing service 106 to send screen data to the sharing session 112. The screen data receiver 210 is configured to communicate with the sharing service 106 to receive screen data from the sharing session 112.

The application data sharing module 204 includes a data compression engine 212, an application data sender 214, and an application data receiver 216. The data compression engine 212 is configured to compress application data for sending to the sharing service 106. The application data sender 214 is configured to communicate with the sharing service 106 to send application data to the sharing session 112. The application data receiver 214 is configured to communicate with the sharing service 106 to receive application data from the sharing session 112.

Figure 3:
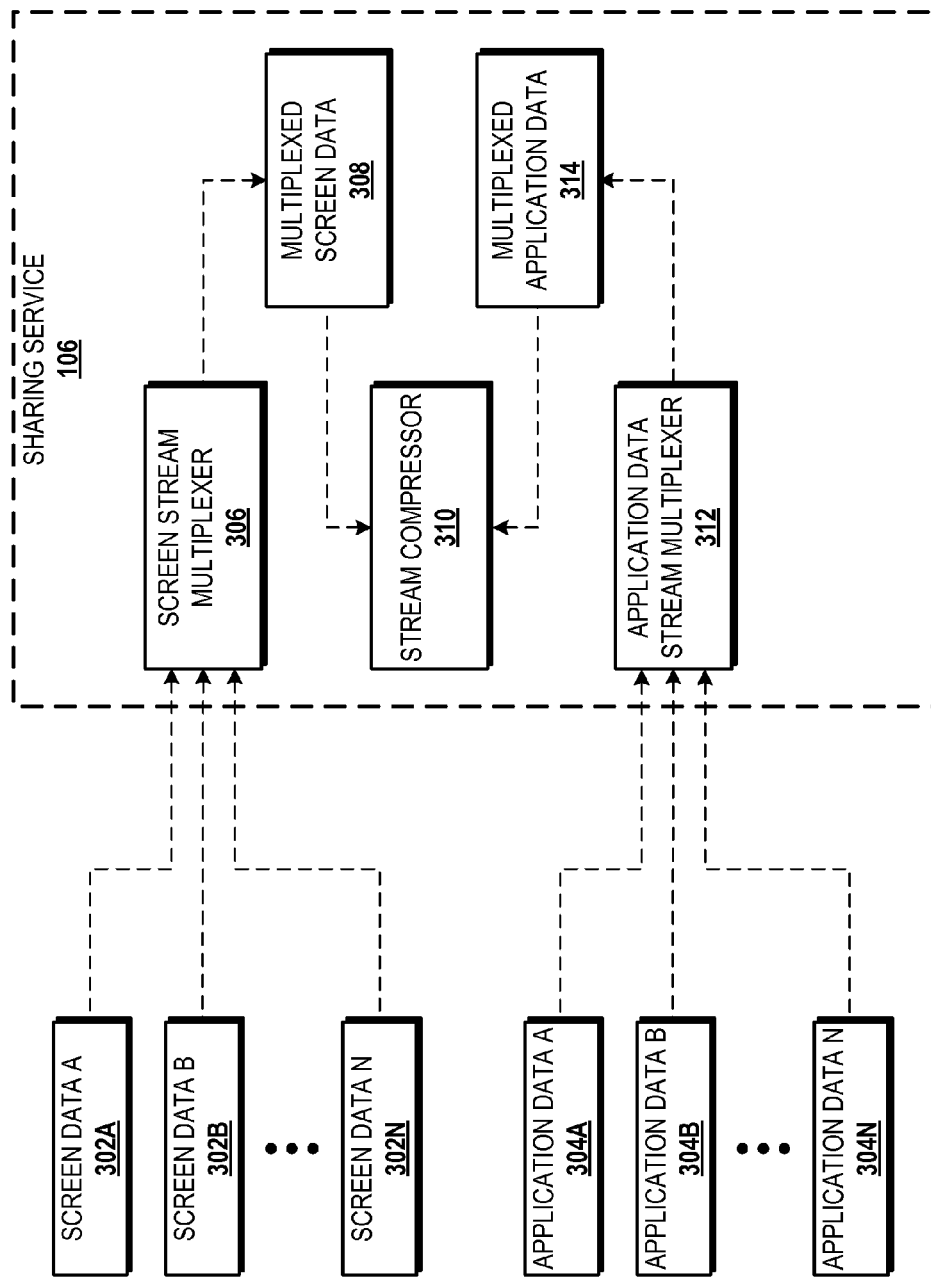
FIG. 3 is a block diagram showing aspects of a sharing service, according to an illustrative embodiment.

Turning now to FIG. 3, additional aspects of the sharing service 106 will be described. In FIG. 3, the sharing service 106 receives screen data 302A-302N and application data 304A-304N from a plurality of computing devices (not shown). The sharing service 106 provides the screen data 302A-302N to a screen stream multiplexer 306. The screen stream multiplexer 306 is configured to receive the screen data 302A-302N and multiplex the screen data 302A-302N to generate multiplexed screen data 308, which is then provided to a stream compressor 310. The stream compressor 310 is configured to compress the multiplexed screen data 308 for delivery to one or more computing devices during a sharing session. The compression technology utilized by the stream compressor 310 can be selected based upon the needs of the sharing service 106 in providing a particular quality of service via a sharing session. As such, the compression level may be increased to conserve network resources or decreased to consume network resources based upon the availability of network resources to support the sharing session.

The sharing service 106 provides the application data 304A-304N to an application data stream multiplexer 312. The application data multiplexer 312 is configured to receive the application data 304A-304N and multiplex the application data 304A-304N to generate multiplexed application data 314, which is then provided to the stream compressor 310 for compression.

Figure 4:
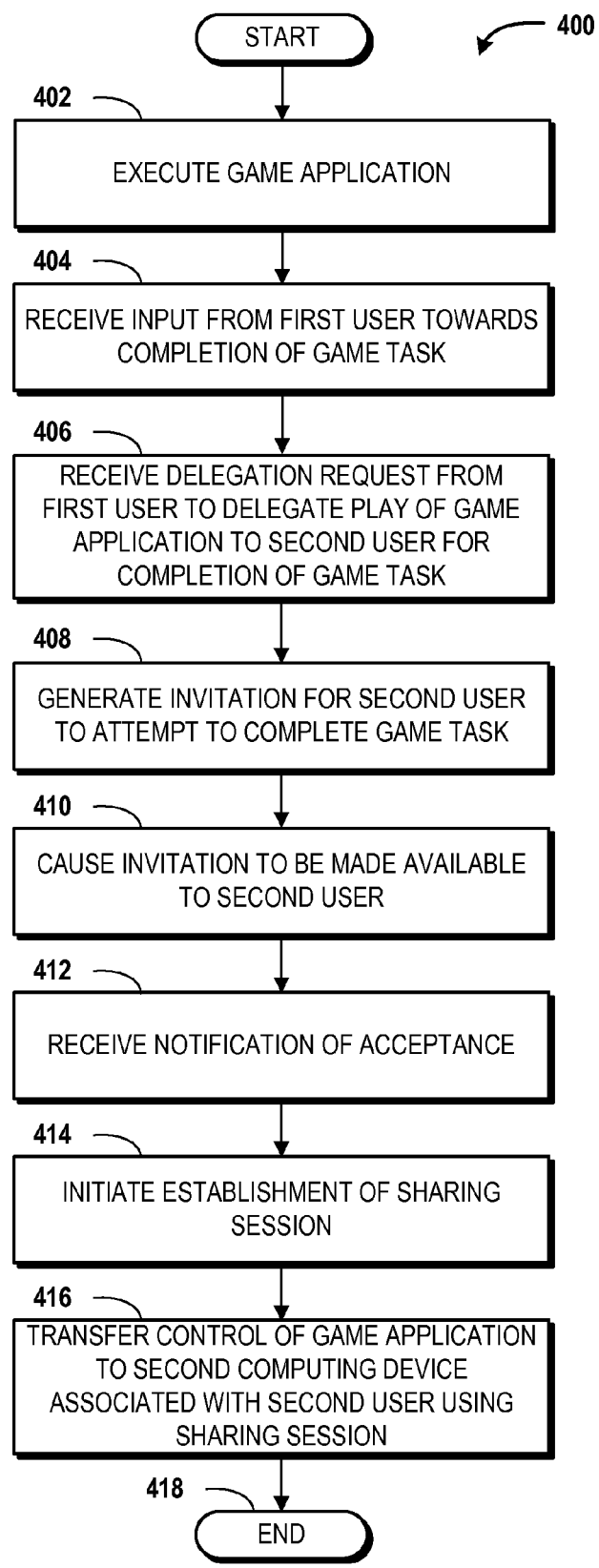
FIG. 4 is a flow diagram showing aspects of a method for delegating a game task, according to an illustrative embodiment.

Turning now to FIG. 4, aspects of a method 400 for delegating a game task will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

The method 400 is described as being performed by a first computing device, such as the computing device A 102A, via execution of one or more software modules such as, for example, the game application 124, the gaming service API 126, the sharing service API 128, and/or the sharing component 130. It should be understood that additional and/or alternative devices and/or network nodes can provide the functionality described herein via execution of one or more modules, applications, and/or other software including, but not limited to, the game application 124, the gaming service API 126, the sharing service API 128, and/or the sharing component 130. Thus, the illustrated embodiments are illustrative, and should not be viewed as being limiting in any way.

The method 400 begins at operation 402, where the computing device A 102A executes the game application 124. From operation 402, the method 400 proceeds to operation 404, where the computing device A 102A receives input from a first user, such as the player A 132A. The input can be received via one or more input devices that are connected to or otherwise in communication with the computing device A 102A. The input is provided by the first user towards the completion of a game task.

From operation 404, the method 400 proceeds to operation 406, where the computing device A 102A receives a delegation request from the first user to delegate play of the game application 124 to a second user, such as the player B 132B, for completion of the game task. In some embodiments, a delegation request option is provided as part of the game application 124 and can be selected by the first user if the first user needs assistance in completing a game task. In some embodiments, the delegation request option "pops up" after a pre-defined number of failed attempts by the first user in completing the game task. The pre-defined number may be set by a developer of the game application 124. In some embodiments, a delegation request option is made accessible to the game application 124 by one or more methods exposed by the gaming service API 126 or the sharing service API 128.

From operation 406, the method 400 proceeds to operation 408, where the computing device A 102A generates an invitation for the second user to attempt to complete the game task in response to the delegation request. In some embodiments, invitation is generated by the game application 124. In some embodiments, the invitation is made accessible to the game application 124 by one or more methods exposed by the gaming service API 126 or the sharing service API 128.

From operation 408, the method 400 proceeds to operation 410, where computing device A 102A causes the invitation to be made available to the second user. From operation 410, the method 400 proceeds to operation 412, where the computing device A 102A receives notification of acceptance of the invitation.

From operation 412, the method 400 proceeds to operation 414, where the computing device A 102A initiates establishment of a sharing session via the sharing service 106. From operation 414, the method 400 proceeds to operation 416, where the computing device A 102A transfers control of the game application 124 to a second computing device, such as the computing device B 102B, that is associated with the second user, such as the player B 132B, via the sharing session. In this manner, the player B 132B can assist the player A 132A to complete the game task, after which the sharing session can be torn down and the player A 132A can resume playing the game application 124.

From operation 416, the method 400 proceeds to operation 418. The method 400 ends at operation 418.

Figure 5:
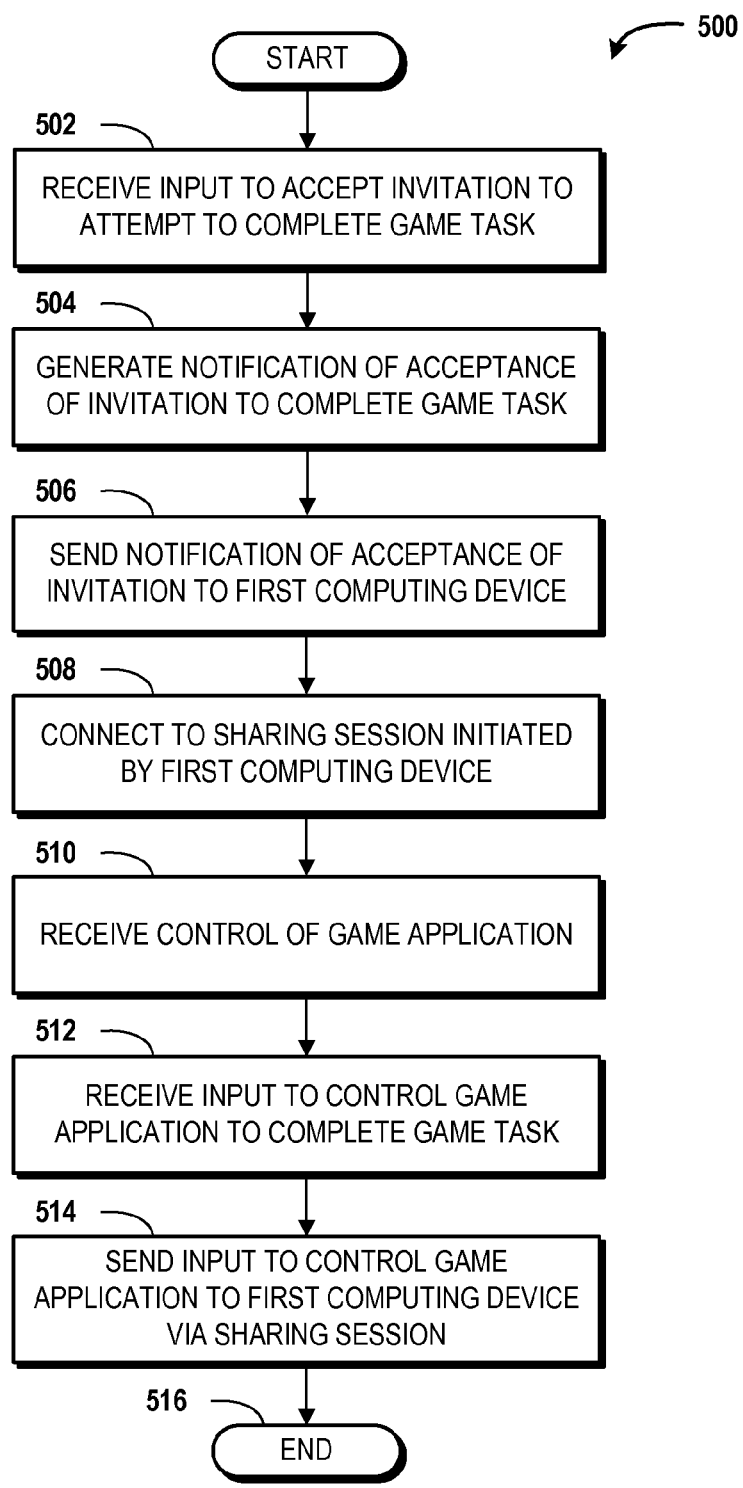
FIG. 5 is a flow diagram showing aspects of a method for accepting delegation of a game task, according to another illustrative embodiment.

Turning now to FIG. 5, aspects of a method 500 for accepting delegation of a game task will be described in detail, according to an illustrative embodiment. The method 500 is described as being performed by a second computing device, such as the computing device B 102B, via execution of one or more software modules such as, for example, the game application 124, the gaming service API 126, the sharing service API 128, and/or the sharing component 130. It should be understood that additional and/or alternative devices and/or network nodes can provide the functionality described herein via execution of one or more modules, applications, and/or other software including, but not limited to, the game application 124, the gaming service API 126, the sharing service API 128, and/or the sharing component 130. Thus, the illustrated embodiments are illustrative, and should not be viewed as being limiting in any way.

The method 500 begins at operation 502, where the computing device B 102B receives input to accept an invitation to attempt to complete a game task. From operation 502, the method 500 proceeds to operation 504, where the computing device B 102B generates a notification of acceptance of the invitation to complete the game task. From operation 504, the method 500 proceeds to operation 506, where the computing device B 102B sends the notification to the first computing device, such as the computing device A 102A.

From operation 506, the method 500 proceeds to operation 508, where the computing device B 102B connects to a sharing session provided by the sharing service 106. The sharing session can be initiated by the first computing device in response to the notification of acceptance of the invitation.

From operation 508, the method 500 proceeds to operation 510, where the computing device B 102B receives control of the game application 124 via the sharing session.

From operation 510, the method 500 proceeds to operation 512, where the computing device B 102B receives input to control the game application to complete the game task. From operation 512, the method 500 proceeds to operation 514, wherein the computing device B 102B sends the input to control the game application 124 to the first computing device 102 via the sharing session.

From operation 514, the method 500 proceeds to operation 516. The method 500 ends at operation 516.

Figure 6:
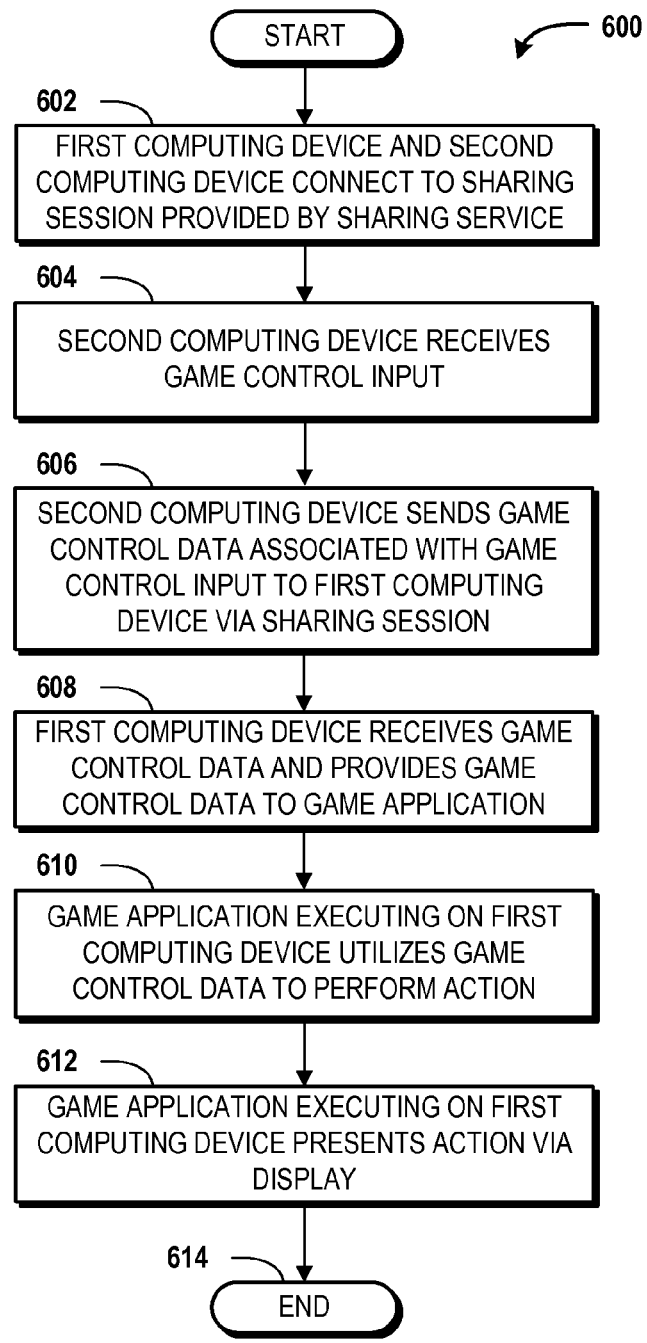
FIG. 6 is a flow diagram showing aspects of a method for sharing game control data, according to an illustrative embodiment.

Turning now to FIG. 6, aspects of a method 600 for sharing game control data using the sharing service 106 will be described in detail, according to an illustrative embodiment. The method 600 begins at operation 602, where a first computing device, such as the computing device A 102A, and a second computing device, such as the computing device B 102B both connect to a sharing session 112 provided by the sharing service 106.

From operation 602, the method 600 proceeds to operation 604, where the computing device B 102B receives game control input. For example, the player B 132B may provide game control input to the computing device B 102B using one or more input devices in an attempt to complete one or more game tasks delegated to the player B 132B by the player A 132A.

From operation 604, the method proceeds to operation 606, where the computing device B 102B sends game control data that is associated with the game control input to the sharing service 106 via the sharing session 112 for delivery to the computing device A 102A. The game control data can include, but is not limited to, instructions that are useable by a game application, such as the game application 124, to perform one or more actions.

From operation 606, the method 600 proceeds to operation 608, where the computing device A 102A receives the game control data from the sharing service 106 and provides the game control data to the game application 124 that is executing on the computing device A 102A. From operation 608, the method 600 proceeds to operation 610, where the game application 124 utilizes the game control data to perform one or more actions. From operation 610, the method 600 proceeds to operation 612, where the game application 124 presents the one or more actions via the display A 116A. In some embodiments, the game application 124 replays the one or more actions defined by instructions included in the game control data so that the player A 132A can watch how the player B 132B is attempting to complete one or more game tasks delegated to the player B 132B by the player A 132A. In this manner, the player A 132A can decide whether or not the player B 132B is performing in such a way that is acceptable to the player A 132A, and if not, the player A 132A can interrupt the replay, as will be described below in greater detail with reference to FIG. 7.

From operation 612, the method 600 proceeds to operation 614. The method 600 ends at operation 614.

Figure 7:
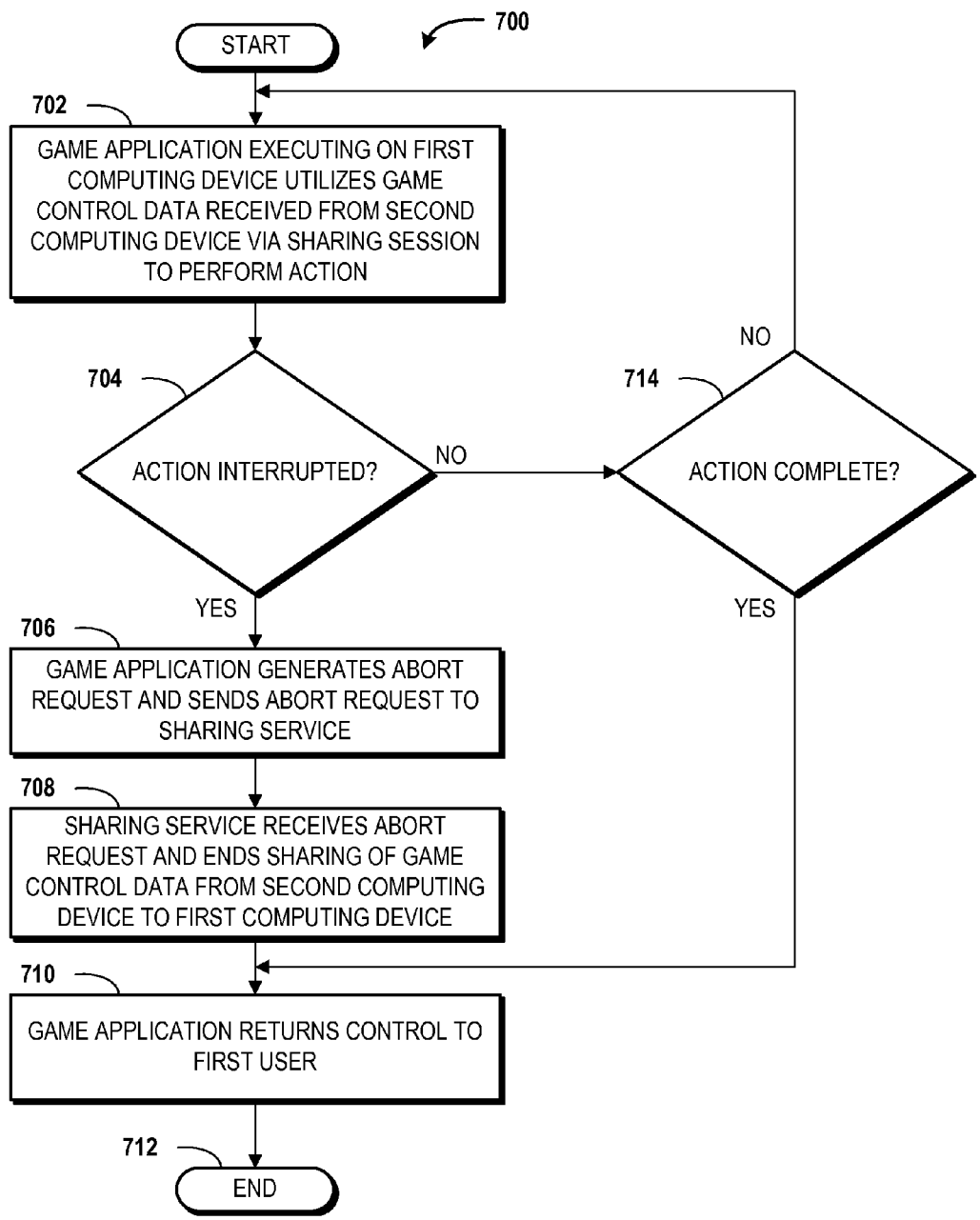
FIG. 7 a flow diagram showing aspects of a method for interrupting game control delegated by a first user to a second user, according to an illustrative embodiment.

Turning now to FIG. 7, aspects of a method 700 for interrupting game control delegated by a first user to a second user will be described in detail, according to an illustrative embodiment. The method 700 begins at operation 702, where the game application 124 utilizes game control data received from the computing device B 102B via the sharing session 112 to perform one or more actions. From operation 702, the method 700 proceeds to operation 704, where the game application 124 determines if an interruption is received. In utilizing the game control data, the game application 124 can replay the game control input provided by the player B 132B on the computing device A 102A so that the player A 132A can watch how the player B 132B is performing. If the player A 132A is not satisfied, the player A 132A can decide to interrupt the replay. In some embodiments, the replay can be interrupted by the player A 132A by providing some input to the game application 124. For example, the game application 124 can provide an icon can be selected by the player A 132A or designate some other input to be used if the player A 132A desires to stop the action perform in response to the game control data.

If, at operation 704, the game application 124 receives an interruption, the method 700 proceeds to operation 706. At operation 706, the game application 124 generates an abort request and sends the abort request to the sharing service 106. From operation 706, the method 700 proceeds to operation 708, wherein the sharing service 106 receives the abort request and ends the sharing session 112 so that the computing device B 102B can no longer provide the game control data to the computing device A 102A. In this manner, the player A 132A can monitor how one or more game tasks are being handled and disconnect from a player to which he or she has designated one or more game tasks if the player is misbehaving or otherwise not performing up to his or her expectations. From operation 708, the method 700 proceeds to operation 710, where the game application 124 returns control to the player A 132A. From operation 710, the method 700 proceeds to operation 712. The method 700 ends at operation 712.

If, at operation 704, the game application 124 does not receive an interruption, the method 700 proceeds to operation 714. At operation 714, the game application 124 determines if the one or more actions have been completed. For example, the game application 124 is no longer receiving the game control data via the sharing session 112. If not, the method 700 proceeds from operation 714 to operation 702. If so, the method 700 proceeds to operation 710, where the game application 124 returns control to the player A 132A. From operation 710, the method 700 proceeds to operation 712. The method 700 ends at operation 712.

Figure 8:
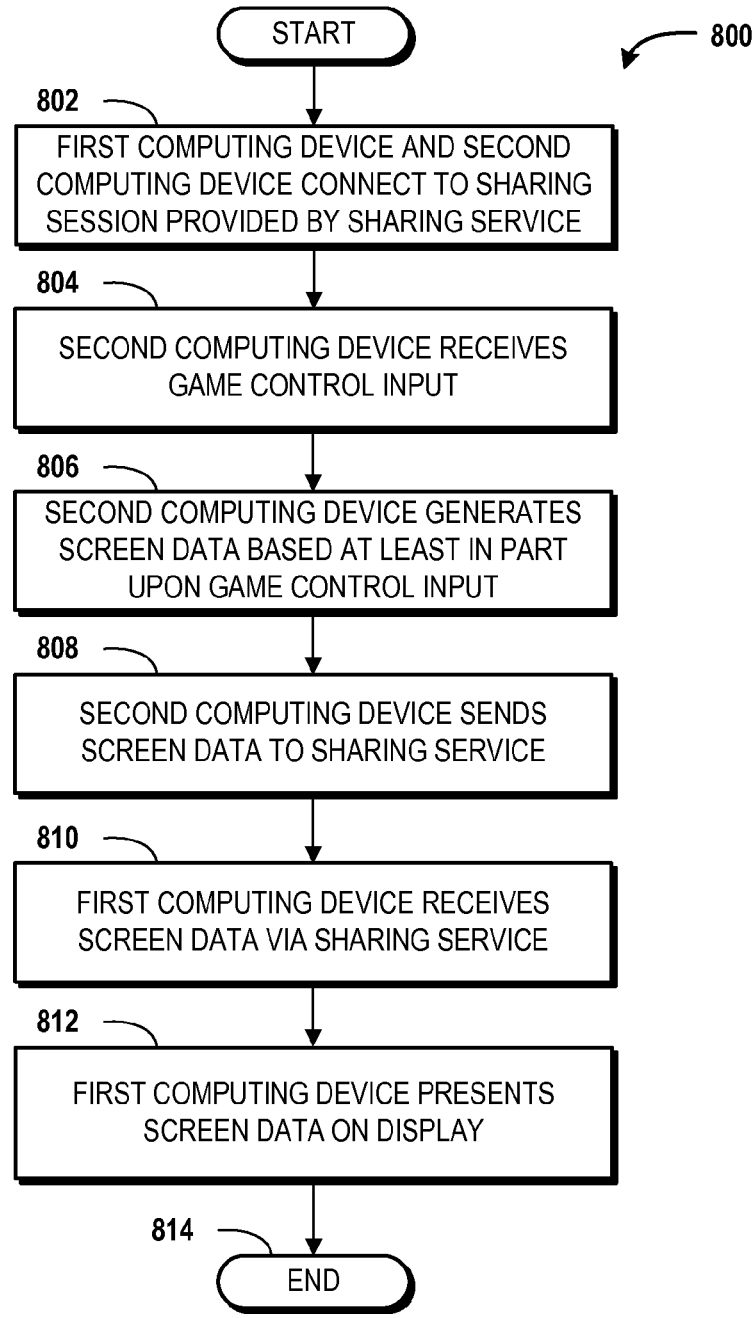
FIG. 8 a flow diagram showing aspects of a method for sharing screen data, according to an illustrative embodiment.

Turning now to FIG. 8, aspects of a method 800 for sharing screen data will be described in detail, according to an illustrative embodiment. The method 800 begins and proceeds to operation 802, where a first computing device, such as the computing device A 102A, and a second computing device, such as the computing device B 102B, both connect to a sharing session 112 provided by the sharing service 108.

From operation 802, the method 800 proceeds to operation 804, where the computing device B 102B receives game control input. For example, the player B 132B may provide game control input to the computing device B 102B using one or more input devices in an attempt to complete one or more game tasks delegated to the player B 132B by the player A 132A.

From operation 804, the method 800 proceeds to operation 806, where the computing device B 102B generates screen data based at least in part upon the game control input received at operation 804. In some embodiments, the screen data includes a screen stream of visual output provided by a game application executed by the computing device B 102B in response to the game control input. For example, as the player B 132B provides input via a controller or other input device, the game application may output data to a display that shows a character responding to the game control input, such as traversing a level, fighting an enemy, or performing some other action.

From operation 806, the method proceeds to operation 808, where the computing device B 102B sends the screen data to the sharing service 106 via the sharing session 112 for delivery to the computing device A 102A. The computing device B 102B can provide the screen data to the sharing service 106 so that the computing device A 102A can access the screen data via the sharing session 112. In this manner, the player A 132A can watch what the player B 132B is doing towards completing one or more game tasks delegated by the player A 132A to the player B 132B.

From operation 808, the method 800 proceeds to operation 810, where the computing device A 102A receives the screen data from the sharing service 108. From operation 810, the method 800 proceeds to operation 812, where the computing device A 102A presents the screen data on a display, such as the display A 116A.

From operation 812, the method 800 proceeds to operation 814. The method 800 ends at operation 814.

In some embodiments, the player A 132A may be able to interrupt the screen session 112 to terminate the screen sharing session if for some reason he or she determines the player B 132B is misbehaving or otherwise not performing up to his or her expectations. In some embodiments, the method 600 and the method 800 may be combined so as to share both game control data and screen data.

Figure 9:
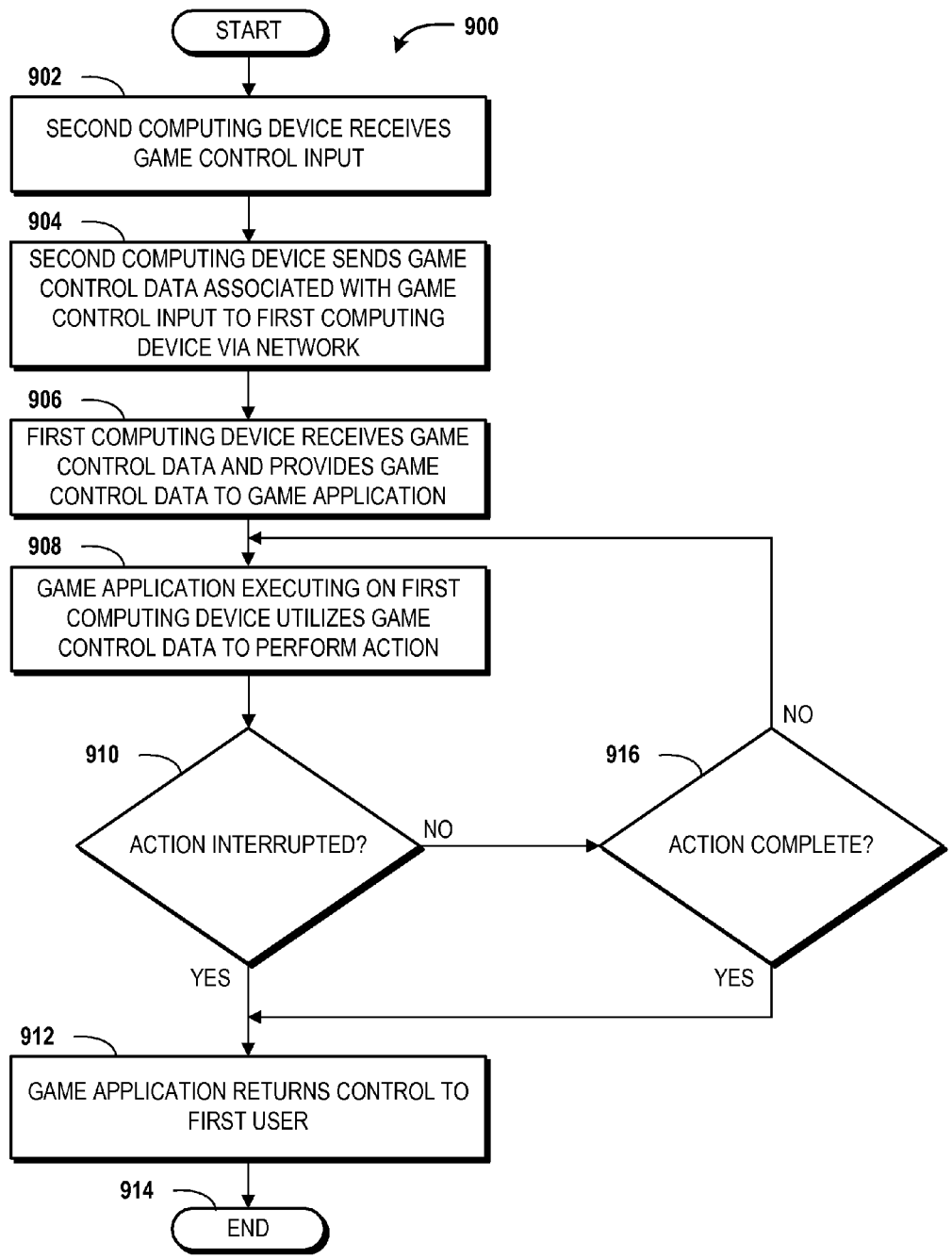
FIG. 9 a flow diagram showing aspects of a method for providing game control data without the use of a sharing service, according to an illustrative embodiment.

Turning now to FIG. 9, aspects of a method 900 for sharing game control data without the use of a sharing service will be described in detail, according to an illustrative embodiment. The methods described above with reference to FIGS. 4-8 utilize a sharing service, such as the sharing service 106, to share screen data and/or application data such as game control data. The method 900 allows players to share game control data without the use of a sharing service. The method 900 may be useful for situations in which network connectivity cannot support a sharing service due to latency issues, bandwidth issues, reliability issues, or other issues.

The method 900 begins at operation 902, where a second computing device, such as the computing device B 102B receives game control input. The game control input is received in response to a player associated with the second computing device, such as the player B 132B who is associated with the computing device B 102B, accepting an invite to complete one or more game tasks on behalf of another player, such as the player A 102A. In some embodiments, the game task is delegated directly to the player B 132B, such as via the gaming service 108. In some embodiments, the game task is made available to a plurality of players via the gaming service 108, and the player B 132B selects the game task.

From operation 902, the method 900 proceeds to operation 904, where the computing device B 102B sends game control data associated with the game control input to the computing device A 102A via the network 104. The game control data may be sent via a peer-to-peer connection established between the computing device A 102A and the computing device B 102B over the network 104. Alternatively, the game control data may be sent to one or more servers configured to support delivery of the game control data. The one or more servers may or may not operate in at least partial support of the gaming service 108.

From operation 904, the method 900 proceeds to operation 906, where the computing device A 102A receives the game control data and provides the game control data to the game application 124. From operation 906, the method 900 proceeds to operation 908, wherein the game application 124 utilizes the game control data to perform one or more actions.

From operation 908, the method 900 proceeds to operation 910, where the game application 124 determines if an interruption is received. In utilizing the game control data, the game application 124 can replay the game control input provided by the player B 132B on the computing device A 102A so that the player A 132A can watch how the player B 132B is performing. If the player A 132A is not satisfied, he or she can decide to interrupt the replay. In some embodiments, the replay can be interrupted by the player A 132A by providing some input to the game application 124. For example, the game application 124 can provide an icon that can be selected by the player A 132A or other input than can be used if the player A 132A desires to stop the action performed in response to the game control data.

If, at operation 910, the game application 124 receives an interruption, the method 900 proceeds to operation 912. At operation 912, the game application 124 returns control to the player A 132A. From operation 912, the method 900 proceeds to operation 914. The method 900 ends at operation 914.

If, at operation 910, the game application 124 does not receive an interruption, the method 900 proceeds to operation 916. At operation 916, the game application 124 determines if the one or more actions have been completed. For example, the game application 124 is no longer receiving the game control data via the network 104. If not, the method 900 proceeds from operation 916 to operation 908. If so, the method 900 proceeds to operation 912, where the game application 124 returns control to the player A 132A. From operation 912, the method 900 proceeds to operation 914. The method 900 ends at operation 914.

Figure 10:
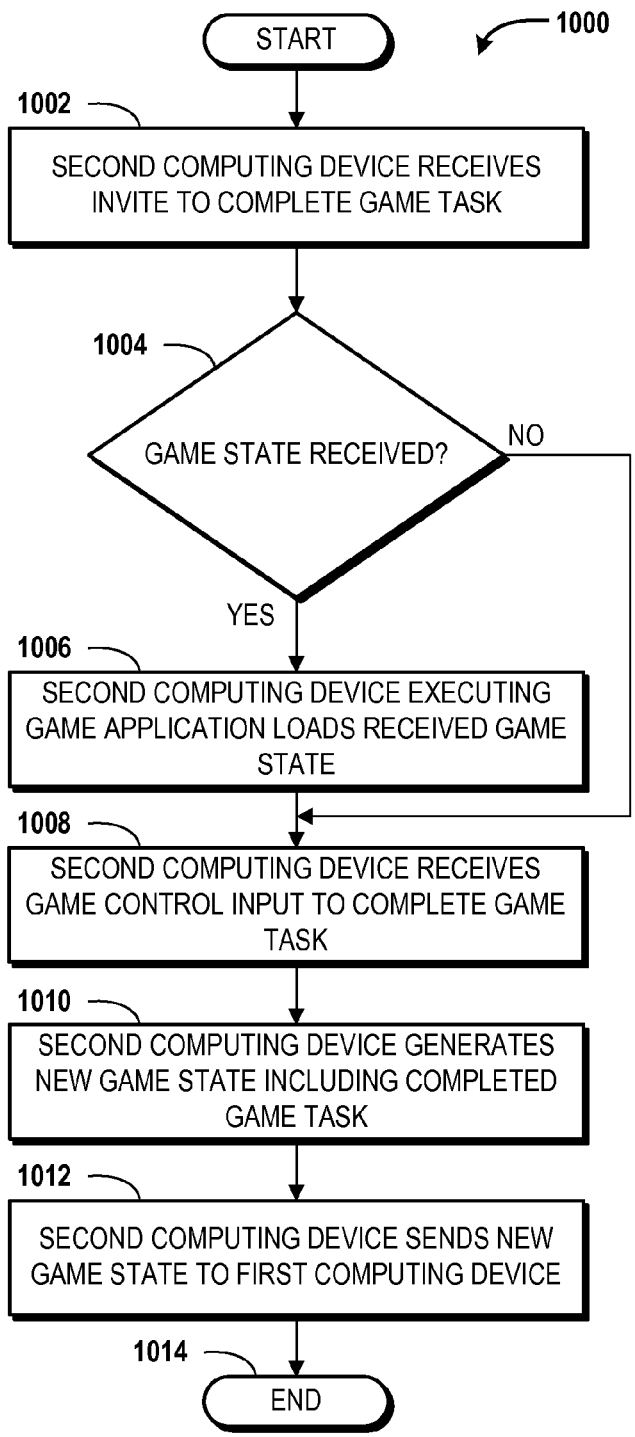
FIG. 10 a flow diagram showing aspects of a method for sharing game state data, according to an illustrative embodiment.

Turning now to FIG. 10, aspects of a method 1000 for sharing game state data will be described in detail, according to an illustrative embodiment. The method 1000 begins and proceeds to operation 1002, where a second computing device, such as the computing device B 102B, receives an invite to complete a game task. In some embodiments, the game task is delegated directly to the player B 132B, such as via the gaming service 108. In some embodiments, the game task is made available to a plurality of players via the gaming service 108, and the player B 132B selects the game task via the gaming service 108, effectively accepting an invite.

From operation 1002, the method 1000 proceeds to operation 1004, where the computing device B 102B determines if a game state has been received. A game state can include a state of a game application before the delegated game task has been completed. In some embodiments, a player delegating a game task may elect to provide a game state so that the player to whom the game task is delegated can begin his or her attempt to complete the game task in particular state of the game that has been achieved by the player delegating the game task. In this manner, the player to whom the game task is delegated can begin his or her attempt to complete the delegated game task from a state other than a beginning state of a game application or other state that may not be conducive to being able to complete the delegated game task within a specific amount of time or under some other constraint. For example, if the game application is a role-playing game, the player delegating the game task might have spent tens or even hundreds of hours developing his or her character and progressing through a storyline provided by the role-playing game. In this example, the player delegating the game task can provide a game state that captures the character's progression and place within the storyline so that the player to whom the game task is delegated can assume control of the character in an attempt to complete the game task with a character progressed in a certain manner and at a particular point in the storyline. Although the concept of game state is not referenced in the description of the methods illustrated in FIGS. 4-9, the concept of game state can be utilized in those methods to provide a game state from which to start the player to whom a game task has been delegated, for example.

If, at operation 1004, the computing device 102B determines that a game state has been received, the method 1000 proceeds to operation 1006, where the computing device B 102B loads the game state into a game application, such as copy of the game application 124, thereby allowing the player B 132B to start his or her attempt to complete the delegated game task from a state other than a beginning state (e.g., new game start) or a game state saved in association with previous play by the player B 132B.

From operation 1006, the method 1000 proceeds to operation 1008. Also, if, at operation 1004, the computing device 102B determines that a game state has not been received, the method 1000 proceeds to operation 1008. At operation 1008, the computing device B 102B receives game control input provided by the player B 102B to complete the game task. From operation 1008, the method 1000 proceeds to operation 1010, where the computing device B 102B generates a new game state that includes the completed game task. From operation 1010, the method 1000 proceeds to operation 1012, where the computing device B 102B then sends the new game state to the computing device A 102A. The computing device A 102A can load the new game state into the game application 124 and resume play of the game application 124 at a state after the game task has been completed on his or her behalf.

From operation 1012, the method 1000 proceeds to operation 1014. The method 1000 ends at operation 1014.

In some embodiments, game states that include one or more completed game tasks can be provided to the gaming service 108. The gaming service 108 can offer a game state on behalf of the user or users that created the game state. In this manner, a particularly skilled player or groups of players can create game states that complete one or more game tasks which might be commonly difficult and therefore attractive to other players. A game state may be offered for free or for some compensation, such as one or more of the various compensations described herein above.

Figure 11:
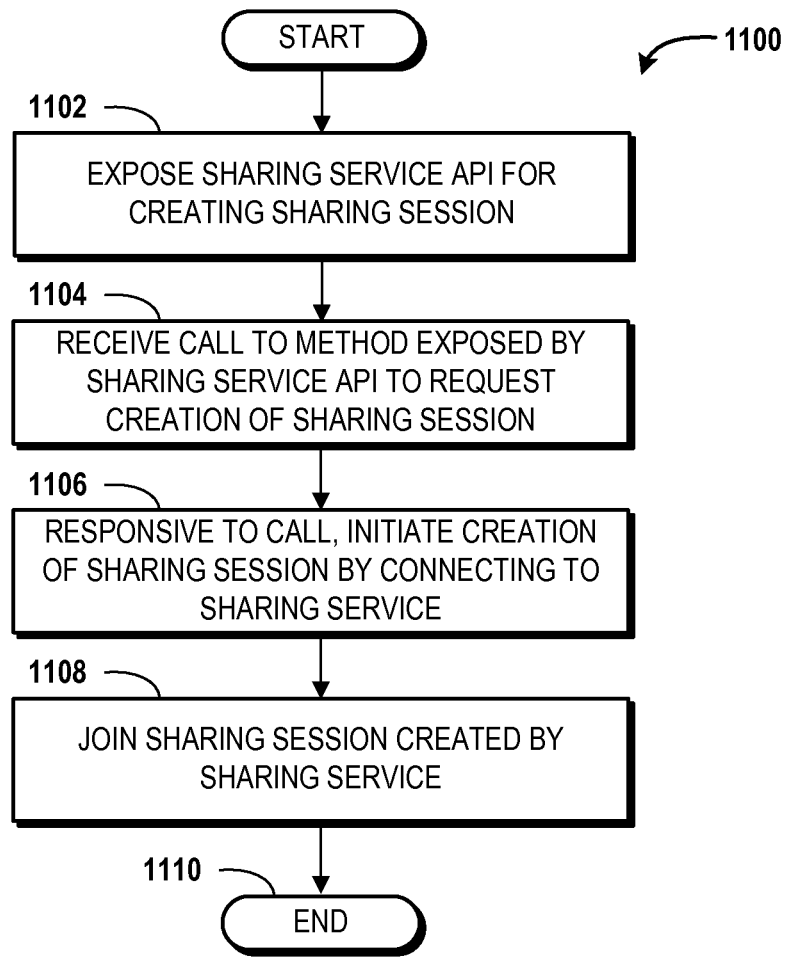
FIG. 11 a flow diagram showing aspects of a method for exposing a sharing service application programming interface ("API"), according to an illustrative embodiment.

Turning now to FIG. 11, aspects of a method 1100 for exposing a sharing service API, such as the sharing service API 128, will be described in detail, according to an illustrative embodiment. The method 1100 begins at operation 1102, where a computing device, such as the computing device A 102A exposes the sharing service API 128 so that one or more applications, such as the game application 124 and/or the other application 131, can call the sharing service API 128 to access the sharing service 106.

From operation 1102, the method 1100 proceeds to operation 1104, where the computing device A 102A receives a call to a method exposed by the sharing service API 128 to request creation of a sharing session, such as the sharing session 112. From operation 1104, the method 1100 proceeds to operation 1106, where, in response to the call, the computing device A 102A initiates creation of the sharing session 112 by connecting to the sharing service 106. From operation 1106, the method 1100 proceeds to operation 1108, where the computing device A 102A joins the sharing session 112 created by the sharing service 106. One or more other computing devices, such as the computing device B 102B, can then connect to the sharing session 112 to share data, such as the shared data B 118B.

From operation 1108, the method 1100 proceeds to operation 1110. The method 1100 ends at operation 1110.

Figure 12:
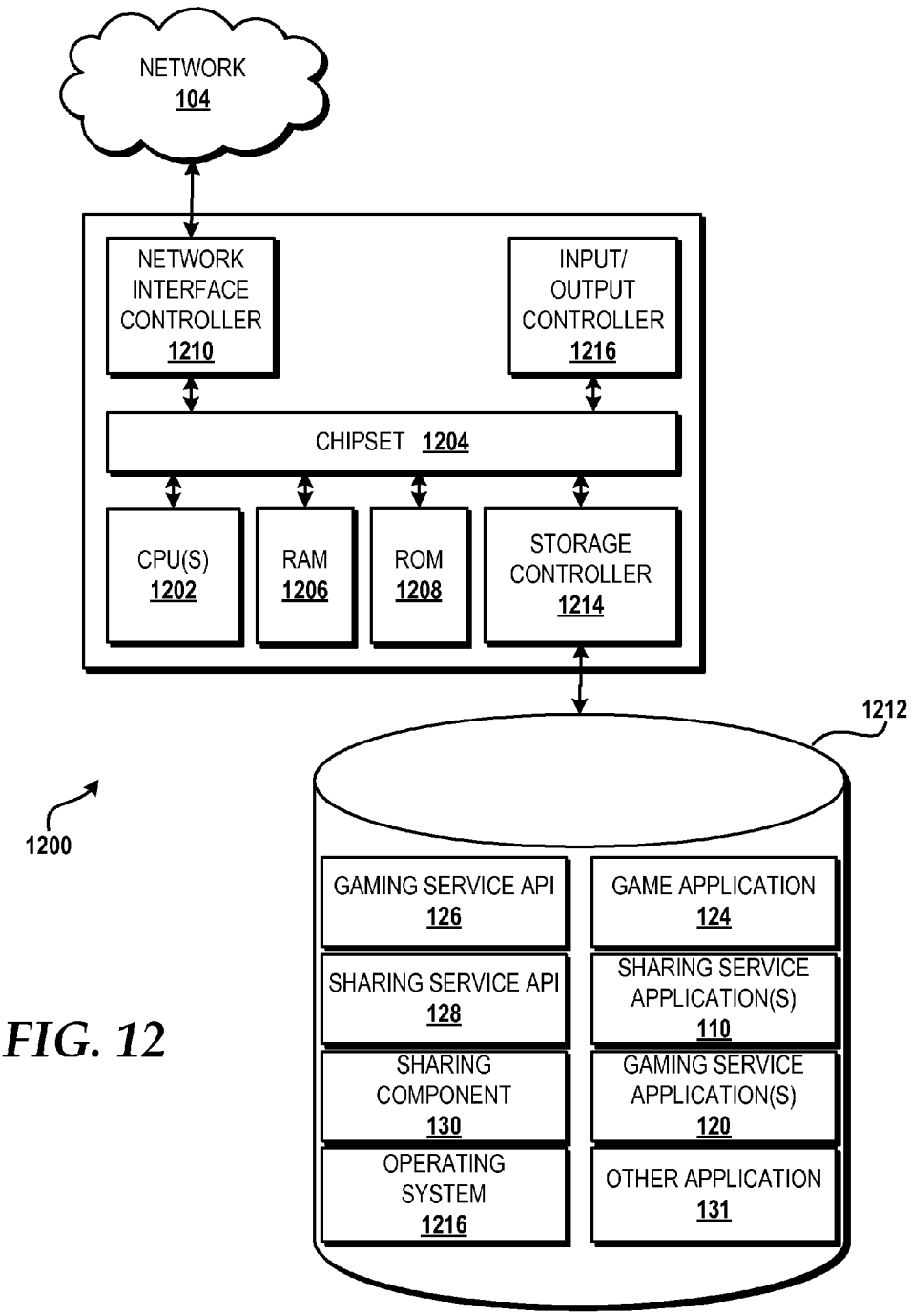
FIG. 12 is a computer architecture diagram showing one illustrative computer hardware architecture for use in computing devices configured to implement the concepts and technologies disclosed herein in one embodiment.

FIG. 12 shows an example computer architecture for a computer 1200 capable of executing the software components described herein for an sharing service API for a sharing service in the manner presented above. The computer architecture shown in FIG. 12 illustrates a conventional server computer, workstation, desktop computer, laptop, electronic book reader, digital wireless phone, tablet computer, network appliance, set-top box, or other computing device. The computer architecture shown in FIG. 12 may be utilized to execute any aspects of the software components presented herein described as executing on the computing device A 102A, the computing device B 102B, the sharing service 106, the gaming service 108, or any other computing platform.

The computer 1200 includes a baseboard, or "motherboard," which is a printed circuit board to which a multitude of components or devices may be connected by way of a system bus or other electrical communication paths. In one illustrative embodiment, one or more central processing units ("CPUs") 1202 operate in conjunction with a chipset 1204. The CPUs 1202 are standard programmable processors that perform arithmetic and logical operations necessary for the operation of the computer 1200.

The CPUs 1202 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 1204 provides an interface between the CPUs 1202 and the remainder of the components and devices on the baseboard. The chipset 1204 may provide an interface to a random access memory ("RAM") 1206, used as the main memory in the computer 1200. The chipset 1204 may further provide an interface to a computer-readable storage medium such as a read-only memory ("ROM") 1208 or non-volatile RAM ("NVRAM") for storing basic routines that that help to startup the computer 1200 and to transfer information between the various components and devices. The ROM 1208 or NVRAM may also store other software components necessary for the operation of the computer 1200 in accordance with the embodiments described herein.

According to various embodiments, the computer 1200 may operate in a networked environment using logical connections to remote computing devices and computer systems through a network, such as a local-area network ("LAN"), a wide-area network ("WAN"), the Internet, the network 104, or any other networking topology known in the art that connects the computer 1200 to remote computers. The chipset 1204 includes functionality for providing network connectivity through a network interface controller ("NIC") 1212, such as a gigabit Ethernet adapter.

For example, the NIC 1210 may be capable of connecting the computer 1200 to other computing devices, such as the computing device A 102A, the computing device B 102B, the sharing service 106, the gaming service 108, a data storage system in, and the like, over the network 104 described above in regard to FIG. 1. It should be appreciated that multiple NICs 1210 may be present in the computer 1200, connecting the computer to other types of networks and remote computer systems.

The computer 1200 may be connected to a mass storage device 1212 that provides non-volatile storage for the computer. The mass storage device 1212 may store system programs, application programs, other program modules, and data, which have been described in greater detail herein. The mass storage device 1212 may be connected to the computer 1200 through a storage controller 1214 connected to the chipset 1204. The mass storage device 1212 may consist of one or more physical storage units. The storage controller 1214 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 1200 may store data on the mass storage device 1212 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1212 is characterized as primary or secondary storage, or the like.

For example, the computer 1200 may store information to the mass storage device 1212 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1212 by detecting the physical states or characteristics of one or more particular locations within the physical storage units.

In addition to the mass storage device 1212 described above, the computer 1200 might have access to other computer-readable media to store and retrieve information, such as program modules, data structures, or other data. It should be appreciated by those skilled in the art that computer-readable media can be any available media that may be accessed by the computer 1200, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 1212 may store an operating system 1216, such as the operating system 122, utilized to control the operation of the computer 1200. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 1212 may store other system or application programs and data utilized by the computer 1200. For instance, when utilized to implement the computing device A 102A, the mass storage device 1212 may store the gaming service API 126, the sharing service API 128, the sharing component 130, the game application 124, and/or the other application 131. When utilized to implement the sharing service 106, the mass storage device 1212 may store the sharing service application(s) 110. When utilized to implement the gaming service, the mass storage device 1212 may store the gaming service application(s) 120.

In one embodiment, the mass storage device 1212 or other computer-readable storage media may be encoded with computer-executable instructions that, when loaded into the computer 1200, transform the computer from a general-purpose computing system into a special-purpose computer capable of implementing the embodiments described herein. These computer-executable instructions transform the computer 1200 by specifying how the CPUs 1202 transition between states, as described above. According to one embodiment, the computer 1200 has access to computer-readable storage media storing computer-executable instructions that, when executed by the computer, perform the various routines and operations described herein.

The computer 1200 may also include an input/output controller 1218 for receiving and processing input from a number of input devices, such as a keyboard, a mouse, a touchpad, a touch screen, an electronic stylus, or other type of input device. Similarly, the input/output controller 1218 may provide output to a display device, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for an API for a sharing service have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for creating a sharing session, the computer-implemented method comprising:

receiving a call from an application to a method exposed by a sharing service application programming interface ("API"), the call requesting creation of a sharing session;

in response to receiving the call to the method exposed by the sharing service API,
connecting to the sharing service,
initiating creation of the sharing session via the sharing service, and
joining the sharing session; and receiving data on a first computing device from a second computing device via the sharing session, wherein the data indicates a difference between a first screen output displayed on a display of the second computing device and a second screen output displayed on the display of the second computing device, the difference being calculated by a screen data differential engine.

2. The computer-implemented method of claim 1, wherein the data further comprises screen data representing the second screen output displayed on the display of the second computing device.

3. The computer-implemented method of claim 2, further comprising:
reconstructing the first screen output based at least in part on (i) the screen data representing the second screen output and (ii) the difference between the first screen output and the second screen output; and
displaying the reconstructed first screen output on a screen of the first computing device.

4. The computer-implemented method of claim 1, wherein receiving the data via the sharing session comprises receiving application data via the sharing session, the application data comprising data associated with input provided to at least the second computing device that is connected to the sharing session.

5. The computer-implemented method of claim 1, further comprising:
receiving input to control the application via the second computing device that is connected to the sharing session; and
sending application data associated with the input to the sharing session.

6. A computer-implemented method for creating a sharing session, the computer-implemented method comprising:
receiving a call from an application to a method exposed by a sharing service application programming interface ("API"), the call requesting creation of a sharing session;
at least partly in response to receiving the call to the method exposed by the sharing service API,
connecting to the sharing service,
initiating creation of the sharing session via the sharing service, and
joining the sharing session;
receiving data via the sharing session, wherein the data includes screen data captured from visual output displayed by one or more displays associated with a second computing device connected to the sharing session and the data identifies a difference between a current screen data displayed on the one or more displays and a previous screen data displayed on the one or more displays;
receiving input to control the application;
sending application data associated with the input to the sharing session; and
receiving a second data associated with screen output of a third computing device from the sharing session, wherein the second data comprises a difference between a current screen output of the third computing device and a previous screen output of the third computing device that has already been sent to the sharing service, the difference being calculated by a screen data differential engine operating on the third computing device.

7. The computer-implemented method of claim 1, wherein the application is a game application, and wherein receiving the data via the sharing session comprises receiving game control data to control the game application.

8. A computer-implemented method for creating a sharing session, the computer-implemented method comprising:
exposing a sharing application programming interface (API) for creating the sharing session;
receiving a call to a method exposed by the sharing API, the call requesting creation of the sharing session; and
in response to receiving the call to the method exposed by the sharing API,
initiating creation of the sharing session by connecting to a sharing service that is configured to create and manage the sharing session, and
joining the sharing session;
displaying, on a first display associated with a first computing device, (i) a first screen output at a first time and (ii) a second screen output at a second time, wherein first screen data represents the first screen output and second screen data represents the second screen output;
transmitting, from the first computing device to a second computing device, screen data via the sharing session, the screen data indicating a difference between the first screen data and the second screen data, the difference being calculated by a screen data differential engine.

9. The computer-implemented method of claim 8, further comprising:
receiving a call exposed by the sharing API to request at least a portion of the data to be sent to the second computing device; and
transmitting the at least the portion of the data to the sharing service via the sharing session for delivery to the second computing device.

10. The computer-implemented method of claim 9, further comprising:
transmitting application data to the first computing device via the sharing session, the application data comprising data associated with input provided to the second computing device that is connected to the sharing session.

11. The computer-implemented method of claim 8, wherein receiving the call requesting creation of the sharing session comprises receiving the call requesting creation of the sharing session from a game application, and wherein the sharing session is utilized, at least in part, to facilitate a delegated game experience, the delegated game experience comprising providing screen data associated with the game application in response to a request from a first user to at least one other computing device that is connected to the sharing session so that at least a second user associated with the at least one other computing device can attempt to complete a game task within the game application on behalf of the first user.

12. An apparatus comprising:
at least one processor; and
a computer-readable storage medium having computer-executable instructions stored thereon which, when executed on the at least one processor, cause the apparatus to perform operations comprising receiving a call from an application to a method exposed by a sharing service application programming interface ("API"), the call requesting creation of a sharing session;

in response to receiving the call to the method exposed by the sharing service API,
  connecting to the sharing service, and
  initiating creation of the sharing session via the sharing service,
  joining the sharing session; and receiving data via the sharing session, the data including a difference between current screen data displayed on a display associated with the second apparatus and previous screen data displayed on the display associated with the second apparatus, the difference being calculated by a screen data differential engine.

13. The apparatus of claim 12, wherein the difference is calculated by the screen data differential engine operating on the second apparatus.

14. The apparatus of claim 13, further comprising:
a second display;
wherein the data includes previous screen data displayed on the display associated with the second apparatus; and
wherein the computer-executable instructions, when executed on the at least one processor, cause the apparatus to perform the further operations comprising:
  reconstructing the current screen data based at least in part on (i) the previous screen data and (ii) the difference; and
  presenting the reconstructed the current screen data on the second display.

15. The apparatus of claim 14, wherein the computer-executable instructions, when executed on the at least one processor, cause the apparatus to perform the further operations comprising:
  receiving a second data associated with screen output of the apparatus; and
  sending the second data associated with the screen output of the apparatus to the sharing session via the sharing service for delivery to the second apparatus.

16. The apparatus of claim 15, wherein receiving the data from the second apparatus further comprises receiving first application data associated with input provided to the second apparatus.

17. The apparatus of claim 16, wherein the computer-executable instructions, when executed on the at least one processor, cause the apparatus to perform further operations comprising:
  receiving second application data associated with input of the apparatus; and
  sending a second data associated with the screen output of the apparatus to the sharing session via the sharing service for delivery to the second apparatus.

18. The computer-implemented method of claim 1, wherein the screen data differential engine operates on the second computing device.

* * * * *